United States Patent

Hepfer

[15] 3,640,789

[45] Feb. 8, 1972

[54] METHOD OF MAKING METAL-PLATED PLASTIC ARTICLES

[72] Inventor: Ivan C. Hepfer, Caledonia, Mich.

[73] Assignee: Furniture City Manufacturing Corp., Grand Rapids, Mich.

[22] Filed: Apr. 1, 1969

[21] Appl. No.: 811,706

[52] U.S. Cl. ............................156/92, 156/150, 156/244, 156/280, 161/182
[51] Int. Cl. ............................................C23b 5/02
[58] Field of Search.......................156/244, 91, 92, 150, 280

[56] References Cited

UNITED STATES PATENTS

| 3,416,992 | 12/1968 | Amos | 156/150 X |
|---|---|---|---|
| 3,420,679 | 1/1969 | Gifford et al. | 156/244 X |
| 3,433,688 | 3/1969 | Staats et al. | 156/91 X |
| 3,444,018 | 5/1969 | Hewitt | 156/92 X |
| 3,453,173 | 7/1969 | Isley et al. | 156/244 X |
| 3,475,248 | 10/1969 | Brasure | 156/244 X |
| 3,477,126 | 11/1969 | Price | 156/244 X |
| 3,476,627 | 11/1969 | Squires | 156/244 |
| 3,486,196 | 12/1969 | Kcenk et al. | 156/244 X |
| 3,562,038 | 2/1971 | Shipley et al. | 156/150 X |

Primary Examiner—Harold Ansher
Attorney—Price, Heneveld, Huizenga & Cooper

[57] ABSTRACT

A platable plastic component and a nonplatable plastic component are joined together into a multicomponent article. The entire multicomponent article is then processed in an operation for plating plastics having the steps of introducing the multicomponent article into a strong oxidizing acid solution, followed by introducing the article into a noble metal solution, then introducing the article into an electroless nickel or copper bath, and finally further processing the article in conventional plating baths.

9 Claims, 6 Drawing Figures

PATENTED FEB 8 1972

3,640,789

INVENTOR.
IVAN C. HEPFER
BY Price, Heneveld
Huizenga & Cooper
ATTORNEYS

METHOD OF MAKING METAL-PLATED PLASTIC ARTICLES

BACKGROUND

This invention relates to the structure of plastic articles and to the plating of metal onto the surface of plastic articles. In many instances, a manufacturer may desire a plastic article which is plated with a protective or decorative coating on only a selected area or portion of the article. The reasons for a choice of this nature are many and varied. For example, one might desire the highly decorative effect which can be achieved by contrasting a plated surface with an exposed unplated surface. Alternatively, it is often necessary to have an article which is selectively conductive to heat or electricity through plating which is on only certain portions of its surface. Still another motive for such an article is the fact that structural parts thereof may be required solely for strength and should not be plated to avoid unnecessary costs.

There are many difficulties in the selective plating of a unitary plastic article. For example, the use of selective masking and the application of resists (stopoff lacquers) that do not become plated during the normal plating operation are in general extremely critical, difficult and expensive to apply. Further, such techniques often produce inconsistent results, and they also involve the need for workers who are technically skilled beyond the usual calling. One way to avoid this basic underlying problem might be to provide separate component parts of an article, completely plate those components having surface portions which are desired to be plated, and then assemble the components together to form the finished article, such that only the desired portions of the plated components are exposed. This approach has several apparent limitations. Firstly, considerable plating metal and expense is wasted. Furthermore, if the unplated plastic components are molded onto the plated components, the high heat of the second molding operation can cause cracking and peeling of the plating on the already-plated component. Additionally, critically close tolerances in the plating of the first component will be required in order for it to properly fit the mold into which it must be placed when molding the second component onto the first. Other means of attachment besides molding, such as sonic welding, adhesive bonding, heat staking and hot stamping, also require close control of the plating thickness.

SUMMARY

The present invention is an article of manufacture and a method of making the same which comprises joining a platable plastic component to a nonplatable plastic component to form a multicomponent article and processing said multicomponent article in a plastic plating operation. Thus, a unitary article having a selectively and partially plated surface can be produced without the attendant technical difficulties which now plague the art. The use of previously joined platable and nonplatable components eliminates the necessity for tedious and expensive masking. Inconsistent results and costly labor are made passe. Molding and plating techniques can be liberalized since the plated part is not exposed to high temperature nor is the second molding operation affected by the plate thickness. Finally, the waste of plating on unexposed surfaces is eliminated.

The nature of the article produced in this process can be discerned by reference to the written disclosure and appended drawings wherein.

PREFERRED EMBODIMENT

Figure 1:
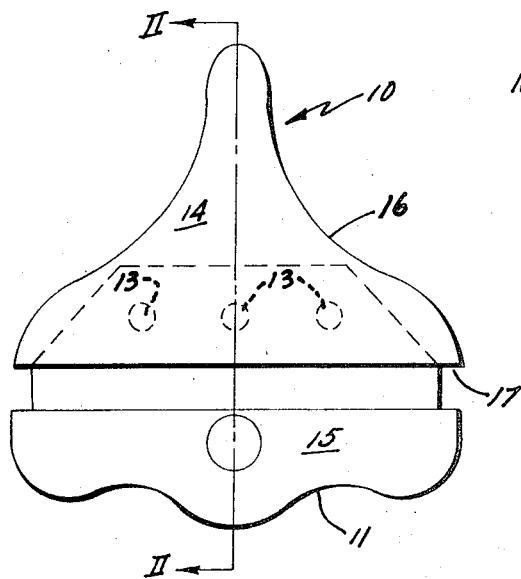
FIG. 1 is a side view of a bicomponent toggle switch embodying the invention.

Some plastic materials, notably ABS (acrylonitrile-butadiene styrene copolymer) are readily plated with metallic coatings such as copper, nickel and chromium. Such coatings are applied for decorative effects or for functional purposes, such as conductivity, wear resistance, etc. The usual plating process or operation for plastic includes the basic steps of chemically etching or conditioning the surface of the plastic, usually in a strong oxidizing acid solution; activating the conditioned surface in a noble metal solution; applying an initial metallic coating to the plastic in an electroless nickel or copper bath; and then further plating the plastic with a desired metal in conventional electroplating solutions. It is presently thought that the first step in this plastic plating process etches or conditions the surface of the plastic such that the noble metal solution of the next step will then "wet" the surface of the plastic and be adsorbed thereon. Furthermore, the noble metal salt which is adsorbed is reduced, by the use of various techniques, resulting in an adsorbed noble metal such as palladium on the surface. The surface is then said to be "activated" so that the electroless solution used in the third step will deposit a thin initial metallic coating upon which heavier electrodeposits can be applied. The fourth step then conforms to conventional electroplating procedures.

On the other hand, some plastics are not as readily platable as ABS. ABS is a terpolymer, including styrene, butadiene and acrylonitrile. Because butadiene is a double bond polymer, it is active and vulnerable to chemical attack and hence the ABS becomes etched in the conditioning bath. Plastics such as polypropylene, however, do not generally include such chemically vulnerable components and hence are not platable in processes by which ABS is readily platable. They are not conditioned, do not "wet," and consequently are neither activated in the noble metal solution nor plated in the electroless plating solution or the electroplating procedures. Polypropylene is a single bond monopolymer and as such is quite stable. Other examples of plastics which are not platable in a process which will readily plate ABS include the following: polysulfone, polyphenylene oxide, polycarbonate, rigid polyvinyl chloride, and diallyl phthalate.

Some of the aforementioned plastics which are not readily platable can in fact be plated by altering the basic process by which ABS is plated. For example, a preconditioning solvent etch can be employed, the solution of strong oxidizing acid or other etching solution can be made more concentrated, and the temperature thereof can be elevated. Other possible alterations of the basic process which may be useful in some cases include introducing the plastic into an accelerating bath prior to its introduction into the noble metal solution; and introducing it into a post-nucleating bath following the noble metal solution treatment.

Thus, the basic electroless process can be altered such that a plastic which is not readily platable, such as polypropylene, can in fact be plated. There are, however, plastics which are particularly chemically resistant, and which are not platable even under the altered basic process referred to above. Under these circumstances, however, far fewer plastics are unplatable and the versatility of the method becomes more limited. In addition, the operating conditions of the electroless process become considerably more critical than they are when the component to be plated is ABS.

Finally, it should be mentioned that considerable work is being done to alter the composition of the plastics such as polypropylene oxide, polysulfone, and other so-called nonplatable plastics, such that they will be platable in a process which will plate ABS. One approach to this involves the introduction of butadiene into the molecular structure. Such modified plastics which have properties such that they can be plated by a process used for plating ABS and can be used in place of ABS in this invention, where another component is used which is not plated during the process.

The present invention capitalizes on the fact that certain types of plastic are platable by a given process while other types of plastic are not platable by the same process. In any given application of the invention, the first such plastic can be referred to as a "platable" plastic, while the second can be referred to as a "nonplatable" plastic, and these terms are to be interpreted in this relative manner in this specification, rather than in an absolute sense. According to the invention, a "nonplatable" plastic component is joined with a "platable" plastic component; and the entire resulting multicomponent article is processed in a plastic plating process of the nature described above, such that the exposed portions of the platable plastic component acquire a metal surface while the exposed portions of the nonplatable plastic component remain unplated. In some instances, the platable component may cover the entire surface of a nonplatable substrate. The latter component is selected because of its strength or other desirable properties while the former component is selected in order to lend beauty to the article.

Figure 2:
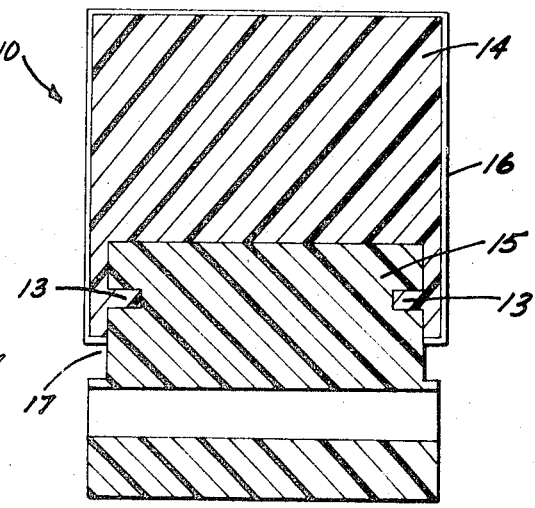
FIG. 2 is a cross section of the toggle switch taken along line II—II of FIG. 1.

One example of this invention is a toggle switch 10 as shown in FIGS. 1 and 2. Basically, this is a conventional switch and operates by the well-known toggle snap action. It has a lever component 14 joined to a working component 15 having a working surface 11, with the lever component 14 having a plated surface 16. The working component 15 of toggle switch 10 must be made of a plastic which is relatively hard, has good strength, has good wear resistance, and has good heat and electrical resistance. Plastics such as polypropylene, polysulfone, polyphenylene oxide, phenolics and certain glass-filled materials meet these standards. Since working surface 11 of toggle switch 10 must also be free of all metal in order to avoid electrical shorts, working component 15 of the switch must additionally be an unplated plastic material. The above-named plastics have a "non-platable" quality when the lever component 14 of the switch 10, which should have a decorative surface and hence be a plated plastic, is ABS. In this case, a polycarbonate is very suitable for the "nonplatable" or working component 15.

In producing toggle switch 10, the higher melting point plastic is molded first. Usually this will be the nonplatable plastic component 15 as is the case where a polycarbonate is used for this component and ABS is used for the platable plastic component or lever component 14. The lower melting point plastic component may then be molded directly onto the higher melting point plastic component. In the advent a thermoset material is used as one component, it must be molded first because of the temperatures and pressures involved. This order is necessary, lest the first molded component be warped when the second component is molded to it. The dies used in molding these components are designed to produce interlocking means 13 for holding the two components 14 and 15 together; for example, hollow passages or voids may be formed in components 15 which are filled by the plastic of which component 14 is made when the latter is molded upon component 15.

The molding and joining of the two components for the switch 10 can be accomplished with two molds, i.e., a first mold for molding the component 15 and the second mold for receiving the molded component 15 and molding the second component 14 onto it. This would be necessary in the event that one component is a thermoset and the other a thermoplastic material. Where the components are to be made of plastics having comparable thermal characteristics, there are other ways to join them, such as by using a single index mold having dual gating in a machine with dual injection systems. The indexing of the mold can be accomplished either by indexing the platen of the machine to which the mold is attached, or by constructing the mold so that it will index itself as it is opened. A third alternative is to mold the components 14 and 15 in completely separate operations and then join them, as by an appropriate adhesive or by a desired mechanical means. Some common mechanical means of joining the two components are sonic welding, spin welding, heat staking and various fasteners. Hot stamping may also be employed where a thermoplastic film is to be joined to another film or molded plastic component.

Once the lever, or platable plastic component 14, and the working or nonplatable plastic component 15 are joined, the resulting multicomponent structure is processed in the plastic plating process. It is introduced into a chemical conditioning solution of a strong oxidizing acid; then it is introduced into an activating or noble metal solution; then it is introduced into an electroless plating solution, generally of copper or nickel; and finally it is electroplated in conventional electroplating baths. In the first step of the plating operation, the ABS or other platable component 14 is chemically etched or conditioned, whereas the polycarbonate component 15 is not chemically attacked by the strong oxidizing acid and remains in its smooth, "as molded" condition. In the second step, the condition ABS component 14 "absorbs" the noble metal salt on its surface and becomes "activated," while the polycarbonate component 15 does not "wet" and thus does not absorb the noble metal salt. In the third step, the ABS component 14 in its activated form takes on a thin layer of metal by chemical reduction of the electroless plating solution. The unactivated polycarbonate component 15, however, remains unaffected by the electroless plating solution. The fourth step of further processing the article in conventional plating baths builds heavier metallic deposits on the ABS component 14, but does not affect the polycarbonate component 15. The resulting surface plating 16 on the ABS component 14 is well bonded to this component, having peel-pull strengths of 5 and 10 pounds or more when a 1 inch strip of plating is pulled at 90° from the surface of the platable component 14. Thus, the end result of this process is a very attractive and very useful unitary article having certain predetermined portions fully plated and other portions completely unplated, as desired.

The process of plating a previously assembled multicomponent article is not without its difficulties, however. The electroplating process, the fourth step in the plastic plating process, has the tendency to deposit rough protrusions or projections on sharp edges, referred to in the art as "treeing." This "treeing" effect is also exhibited at the intersection of the exposed surfaces of the platable and nonplatable plastic materials, but it can be diminished, if not eliminated, by designing the multicomponent article such that the intersections of the exposed surfaces of the platable and nonplatable plastic components define shielding configurations. For example, it will be noted that the intersections of the exposed surfaces of the platable plastic component 14 and the nonplatable plastic component 15 of the toggle switch 10 define inside corners 17. Such inside corners shield the points of intersection of the exposed surfaces and lower the current density at these points; consequently, the presence of a nonplatable wall adjacent a platable wall and at roughly right angles thereto will act to shield the platable wall and prevent "treeing."

Figure 3:
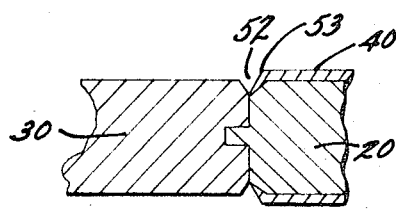
FIG. 3 is an enlarged, fragmentary sectional elevation showing the intersection of a platable plastic component and a nonplatable plastic component.

FIG. 3 shown another example of this invention for the purpose of illustrating another type of shielding configuration. As an alternative to inside corners 17, grooves 52 can be designed at the intersection of the exposed surfaces of platable and nonplatable components. More particularly, where a platable plastic component 20 is joined to a nonplatable plastic component 30 in an exposed plane, where the exposed intersecting surfaces of the platable plastic material 20 and the nonplatable plastic material 30 would normally form a continuous planar surface, it is advantageous to provide a groove 52 along such intersection. Were it not for such a groove, the "treeing" phenomenon would occur at the line of intersection of the two plastic components. The presence of the groove 52 lowers the current density at the intersection of the surfaces, and thus will prevent, or at least substantially reduce, the "treeing" effect. The groove 52 should be quite deep and relatively steep, so that the current density in the groove 52 will be appreciably lower than that at the shoulder 53 of the groove 52. The steep "throw" in the groove 52 tends to feather out the plated coating 40 as it extends into the groove 52. Thus, in the groove type of shielding configuration 52 as well as the inside corner type of shielding configuration 51, the presence of the adjacent nonplatable wall at generally right angles of the platable wall acts to shield the platable wall and thus prevent "treeing." Another advantage of this type of design is that the edge of the plate is protected from "catching" and being torn loose when the surface on the article is abraded at the intersection of the plated and unplated surface. An additional advantage is that any "treeing" that does occur is not as obvious as it would be if the groove design were not used.

Figure 4:
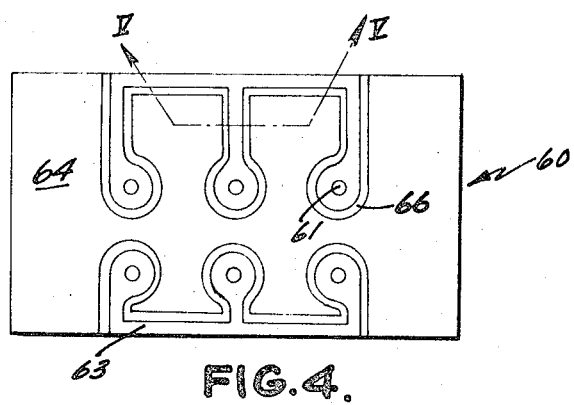
FIG. 4 is an overhead plan view of a circuit board embodying the invention.
Figure 5:
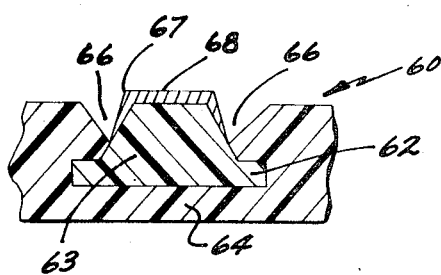
FIG. 5 is an enlarged, fragmentary sectional elevation taken on line V—V of FIG. 4.

Another example of this invention is the printed circuit board 60 of FIGS. 4 and 5. In this embodiment, panel board 64 is made of a nonconductive nonplatable plastic material. If made of a polycarbonate, it will be molded first with appropriate openings for the circuitry pattern 63, which is then molded onto the circuit board 64 out of a platable plastic material such as ABS. As can be seen from the cross section in FIG. 5, the circuit pattern or platable plastic component has interlocking edge means 62 which are molded into recesses molded into the circuit board 64. There are openings 61 in the board for mounting electrical components, and these openings are also formed in the platable plastic circuit path portions 63. Also, it should be noted that the intersection of the exposed surface of the platable plastic component 63 with the exposed surfaces of the nonplatable plastic circuit board 64 have been designed to define grooves 66, which are directly analogous to the groove 52 described above, and which provide a shielding configuration such as was discussed in the previous example. Shoulder 67 is analogous to shoulder 53 above. The actual molding and joining operations for the circuit board 60 can be performed in any of the ways which were described in connection with the toggle switch 10. After the platable plastic circuitry pattern 63 is joined to the nonplatable circuit board 64, the entire circuit board assembly 60 is then processed through conditioning, activating, electroless plating and electroplating solutions as described previously. The platable plastic component 63 becomes plated with a metal coating 68, as shown in the cross section of FIG. 5, and the nonplatable plastic component 64 is not plated at all. The circuitry pattern 63 will then conduct electricity, while the circuit board 64 will not. For purposes of electroplating, the entire circuitry patten 63 should be interconnected as shown in FIG. 5, and these interconnections may be ground off or stripped off where necessary once the circuit was completely plated. Thus, it is possible to produce printed circuit boards 60 without resorting to the photographic methods or strip back methods which are commonly used today.

Figure 6:
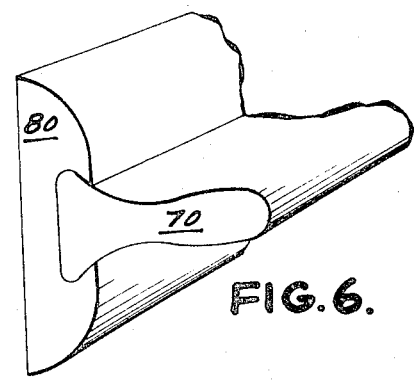
FIG. 6 is a fragmentary perspective view of a platable plastic component in another embodiment of the invention.

Finally, the device of FIG. 6 is also made of a platable plastic component 70 and a nonplatable plastic component 80. The purpose of this example is to demonstrate still another way of joining a platable plastic component to a nonplatable plastic component. Because of the uniform configuration of the device of this example along its longitudinal axis, it can be manufactured by extruding the two different plastic materials from a dual extrusion die. Thereafter, the plating process is the normal plastic plating operation as previously described.

It is understood that the above description of this invention is merely the preferred embodiment with examples, and that changes, alterations, and other applications could be made thereof without departing from the spirit and broader aspects of the invention.

The embodiments of the invention in which an exclusive property or privilege is claimed are defined as follows:

1. A method of making an article of manufacture of a predetermined shape in which certain predetermined exposed areas are to be metallic plated and the remaining exposed areas are not comprising the following steps in the order recited: selecting an electroless preplating process for applying an initial metallic coating to a plastic; joining a first plastic component, which is platable by said electroless plating process, with a second plastic component which is not platable by said electroless plating process, in a manner covering portions of the surface of said first plastic component and leaving other portions exposed such that said first plastic component has exposed surfaces corresponding to the said certain predetermined exposed areas to be metallic plated and said second plastic component has exposed surfaces corresponding to the said remaining exposed areas which are not to be plated, and thereby selectively masking portions of the surface of said first platable plastic component; processing the joined multicomponent article by said electroless plating process to thereby deposit an initial metallic coating on the exposed surfaces of said platable plastic component; finally processing said joined multicomponent article in electrolytic plating baths to thereby further plate said exposed surfaces of said platable plastic component.

2. The method of claim 1 wherein said step of joining said components includes the orienting of the said exposed surfaces of one such component at an angle to the exposed surfaces of the other at the intersection of said exposed surfaces, to provide a shielding configuration at such intersection for diminishing the treeing effect of the plating there.

3. The method of claim 1 wherein said joining step is carried out by molding one of said plastic components over the other such component.

4. The method of claim 3, wherein said one component is said first platable component.

5. The method of claim 1, wherein said joining step is carried out by mechanically fastening said components together.

6. The method of claim 1 wherein said joining step is carried out by extruding one of said components onto the other.

7. The method of claim 11, wherein said components are extruded together in interconnected relation.

8. A method of making an article of manufacture of a predetermined shape in which certain predetermined exposed areas are to be metallic plated and the remaining exposed areas are not comprising the following steps in the order recited: selecting a conditioning bath for use in an electroless preplating process; joining a first plastic component, which is vulnerable to chemical attack in said conditioning bath, with a second plastic component which is not vulnerable to chemical attack in said conditioning bath, said first plastic component having exposed surfaces corresponding to the said certain predetermined exposed areas to be metallic plated and said second plastic component having exposed surfaces corresponding to the said remaining exposed areas which are not to be plated, the said first and second components being joined in a manner covering portions of the surface of said first component and leaving other portions exposed thus selectively masking the unexposed surface of said first plastic component; processing the joined multicomponent article in said conditioning bath to thereby condition the exposed surfaces of said first plastic component; activating said conditioned surface of said first plastic component; applying an initial metallic coating to said activated surface in an electroless bath; finally processing said joined; multicomponent article in an electrolytic plating bath to thereby plate said exposed surfaces of said first component.

9. A method of making an article of manufacture comprising the following steps in the order recited; joining a first plastic component consisting of an acrylonitrile butadiene styrene copolymer with a second plastic component selected from the group consisting of polypropylene, a polysulfone, polyphenylene oxide, a polycarbonate, rigid polyvinyl chloride and diallyl phthalate in a manner covering portions of the surface of said first plastic component and leaving other portions exposed thus selectively masking the surface of said first component; processing the joined multicomponent article in electroless plating baths to thereby deposit an initial metallic coating on to the exposed surfaces of said first plastic component; finally processing said joined multicomponent article in an electrolytic plating bath to thereby further plate said exposed metallic coated surface of said first plastic component.

* * * * *